Aug. 30, 1932.  J. B. ARMITAGE  1,874,218

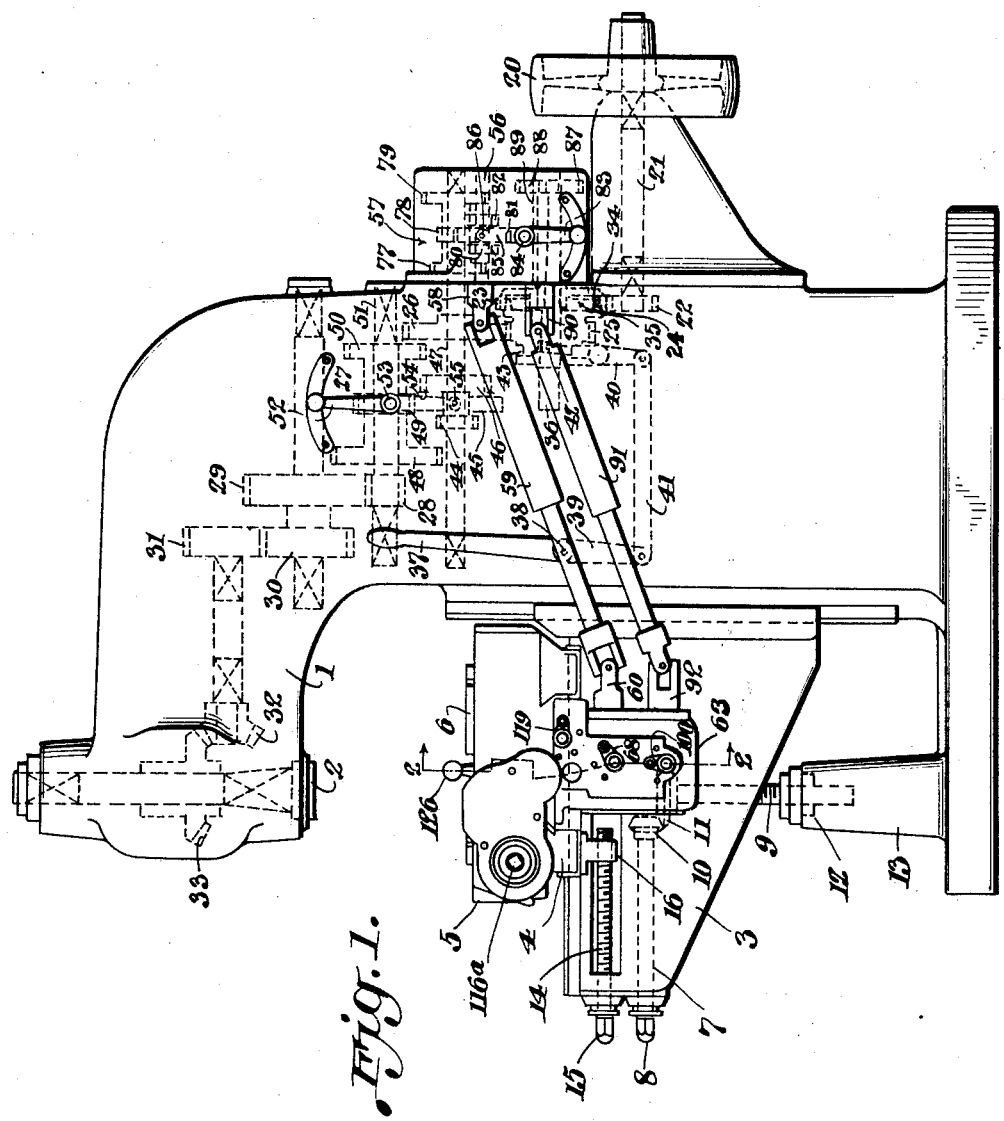

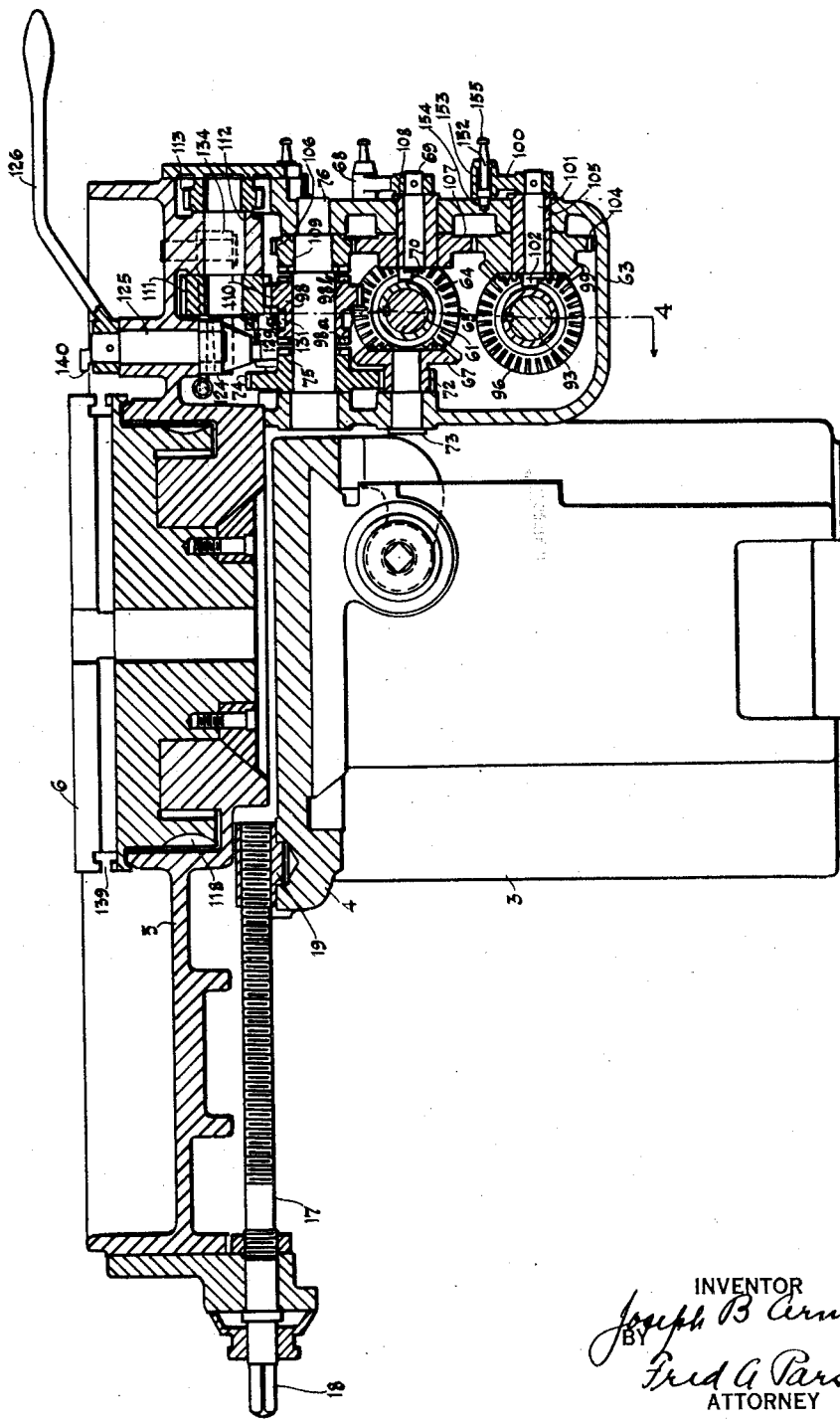

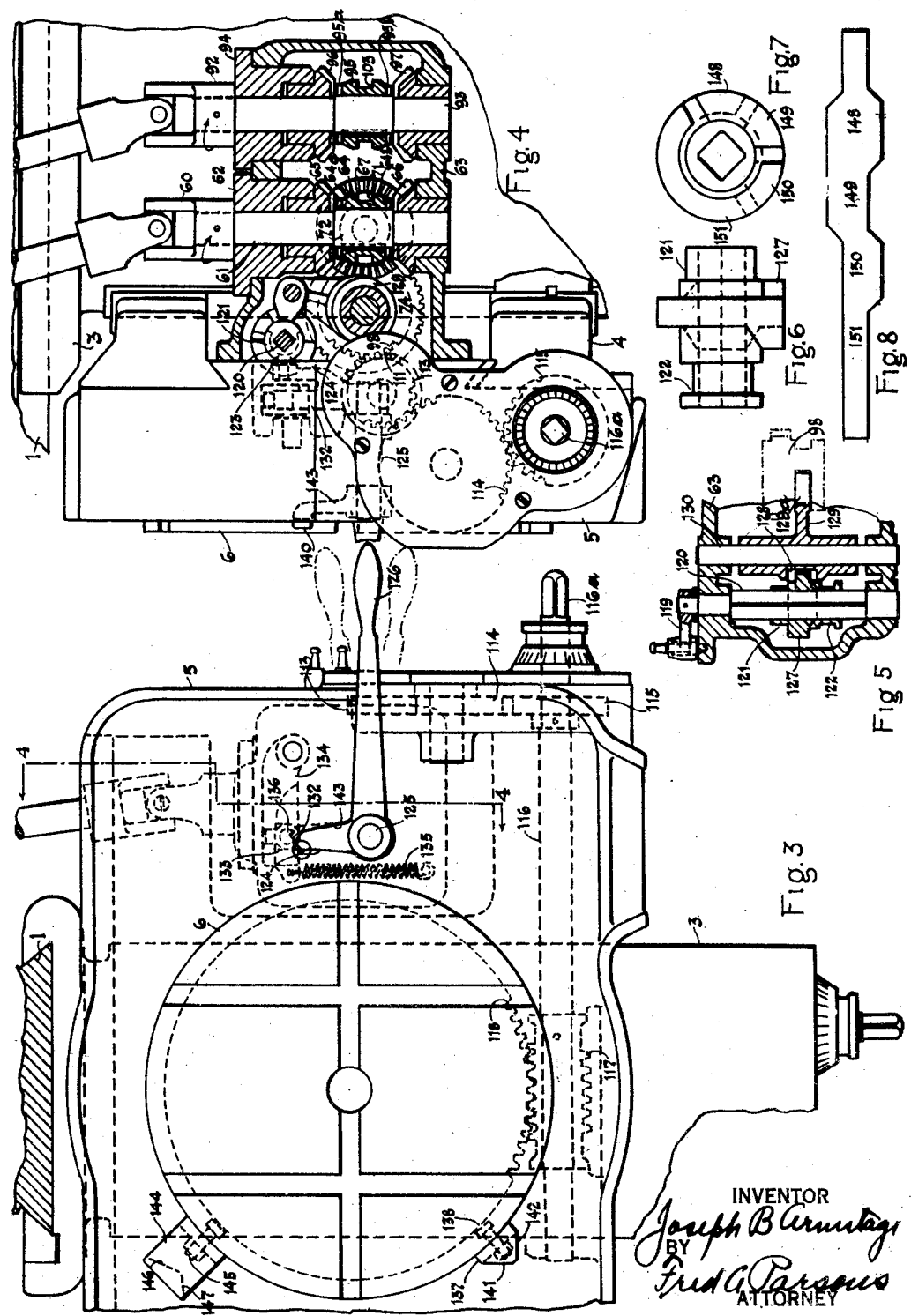

ROTARY MILLING MACHINE

Filed June 7, 1929    4 Sheets-Sheet 4

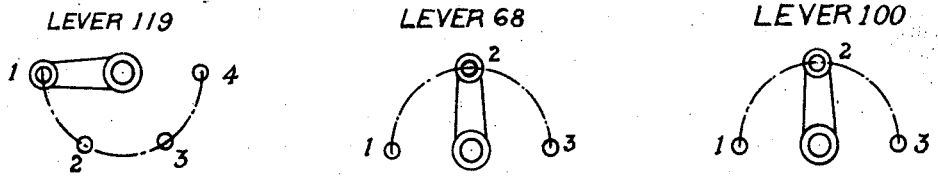

AUTOMATIC CYCLES

| LEVER POSITIONS | | | TABLE MOVEMENTS & DIRECTIONS | |
|---|---|---|---|---|
| LEVER 119 | LEVER 68 | LEVER 100 | ──── FEED ------- QUICK TRAV. | |
| 1 | 1 | 2 | ○ | Any power movement is Feed which may be continuous or interrupted by dogs 137 at any point. |
| 1 | 3 | 2 | ○ | |
| A  4 | 1 | 1 | ○ | Feed and Quick Traverse alternate. The change can be effected at any point and as often as desired by suitable dogs. |
| 4 | 3 | 3 | ○ | |
| 2 | 1 | 1 | ⌒ | Started by hand movement of lever 126; rate is changed by a dog at any intermediate point; at end of movement a dog stops the table, which is then manually returned to the starting point. |
| 3 | 1 | 1 | ⌒ | |
| 2 | 3 | 3 | ⌒ | |
| 3 | 3 | 3 | ⌒ | |
| 2 | 1 | 3 | ⌒ | Automatic reverse at one end of movement; stop at the other, the cycle is started again by hand movement of lever 126. |
| 3 | 1 | 3 | ⌒ | |
| 3 | 3 | 1 | ⌒ | |
| 2 | 3 | 1 | ⌒ | |
| 4 | 1 | 3 | ⌒ | Automatic reverse at each end for continuous cycle. |
| 4 | 3 | 1 | ⌒ | |
| B  2 | 1 | 1 | ○ Stop/Stop | The table stops after each feed movement, started again by hand movement of lever 126. The change from quick traverse to feed can be effected at any point and as often as desired. |
| 2 | 3 | 3 | ○ Stop/Stop | |

Fig. 9

INVENTOR
Joseph B Armitage
BY
Fred G Parsons
ATTORNEY

Patented Aug. 30, 1932

1,874,218

UNITED STATES PATENT OFFICE

JOSEPH B. ARMITAGE, OF WAUWATOSA, WISCONSIN, ASSIGNOR TO KEARNEY & TRECKER CORPORATION, OF WEST ALLIS, WISCONSIN

ROTARY MILLING MACHINE

Application filed June 7, 1929. Serial No. 369,033.

This invention relates to milling machines and more particularly to rotary table milling machines.

An object is to provide improved rotary table transmission mechanism for alternative operation at either a cutting feed rate or a rapid traverse non-cutting rate, and at either rate in either direction of rotation.

Another purpose is to provide an improved organization of such transmission mechanism with other transmissions of the milling machine and with the milling machine supports or structure.

Another object is to provide improved control mechanism both hand and automatic, for such a rotary table transmission.

Another object is to provide a rotary table milling machine in which the table and cutter are relatively bodily movable in a variety of paths, and an improved organization of such structure with transmission and control mechanism such as mentioned above.

Another object is generally to simplify and improve the construction and operation of rotary table milling machines, and still other objects will be apparent from this specification and the accompanying claims.

The invention consists of the particular structure herein illustrated, described and claimed and in such modifications of the structure shown as may be equivalent to the claims.

Fig. 1 shows a side elevation of a vertical spindle milling machine with rotary table which incorporates the invention.

Fig. 2 is an enlarged partial front elevation of the same machine partly in section along line 2—2 of Fig. 1.

Fig. 3 is an enlarged partial plan view of the rotary table of the machine shown in Fig. 1 and certain associated parts.

Fig. 4 shows an end view of the mechanism shown in Fig. 3 partly in section taken along line 4—4 of Figs. 2 and 3.

Fig. 5 is a fragmentary developed section of certain control mechanism of the machine as will be later described.

Figs. 6–7 are side and end elevations of a member shown in Fig. 5 and Fig. 8 is a developed surface portion of the same member.

Fig. 9 is a chart or diagram of various table movements and corresponding lever positions.

The machine includes a hollow column or support 1, Fig. 1, a tool spindle or support 2 rotatably journaled in the column, a knee or support 3 vertically slidable on the column, a saddle or support 4 horizontally slidable toward and from the column on knee 3, a table base or support 5 horizontally slidable on the saddle in a direction transverse to the saddle movement, and a work support or table 6 rotatably supported on base 5; whereby table 6 may in addition to its rotary movement be bodily moved in three mutually transverse paths.

Means are provided for the manual movement of knee 3, consisting of a shaft 7, Fig. 1, journaled in the knee and having an end 8 squared to receive a hand crank, not shown. A screw 9 journaled in knee 3 is connected with shaft 7 by the means of gears 10–11 and threadedly engages a nut 12, fixed in an upward extension 13 of the base of column 1.

Means are provided for manual movement of saddle 4 consisting of a screw 14, Fig. 1, journaled in the knee and having an end 15 squared to receive a crank, not shown, and threadedly engaging a nut 16 fixed with the saddle.

Means are provided for manual movement of support 5, consisting of a screw 17, Fig. 2, journaled in the support and having an end 18 squared to receive a crank not shown, and engaging a nut 19 fixed with the saddle.

Spindle 2 may be driven from a power source consisting of a pulley 20, Fig. 1, through a train including a shaft 21, gears 22–23, a clutch generally denoted by numeral 24, gears 25–26, a rate changer generally denoted by numeral 27 and gears 28–29, 30–31, 32–33.

Clutch 24 is as follows: Gear 23 provides a tapered friction socket 34 complementary to a tapered friction cone 35 fixed with gear 25, the gear 25 and cone 35 being on the supporting shaft 36 to engage and disengage the cone and socket by the means of a hand lever 37 fixed on a pivot or shaft 38 upon which is also fixed a lever 39 connected with a pivoted lever 40 by means of rod 41; lever 40 having a pivoted shoe 42 engaging an annular groove 43 formed in the extended hub of gear 25.

Rate changer 27 is as follows: Gears 44-45-46 are fixed together and slidably splined on a shaft 47, which is driven from gear 26 and are of different diameter respectively adapted for engagement one at a time with complementary gears 48-49-50. Gears 48-49-50 are fixed on shaft 51 which drives the gear 28. The gears 44-45-46 may be moved to engage the respective gears 48-49-50 by means of a hand lever 52 fixed on a pivot or shaft 53 upon which is also fixed a lever 54 having a pivoted fork 55 engaging with the end faces of the gear 45.

A feed train is driven from a point in the spindle train which is between clutch 24 and rate changer 27 as follows: The shaft 47, Fig. 1, drives a shaft 56 through a rate changer generally denoted by the numeral 57. Fixed on shaft 56 is the driving member 58 of an extensible universal joint shaft of well known construction, generally denoted by the numeral 59 of which a driven member 60 is fixed on a shaft 61, Figs. 2 and 4, journaled in a sleeve 62 fixed in a housing 63 which is fixed with base or support 5. A clutch member 64 is slidably keyed to the shaft 61 and at each end is provided with clutch teeth 64a, 64b, which may engage complementary clutch teeth on the bevel gears 65-66, respectively or the member 64 may be centrally positioned for disengagement of the clutch teeth. Gears 65-66 are rotatable on shaft 61 and each engage a bevel gear 67 which is thus driven in the one or the other direction according to clutch engagement. This clutch and gear arrangement constitutes a feed reverser having a central disengaged position and operable by means of a lever 68, Fig. 2, fixed on a shaft 69 having an eccentric portion 70 which engages an annular groove 71 of the clutch member 64. The bevel gear 67 is fixed with a pinion 72 supported for rotation by a stud 73. Pinion 72 drives a gear 74 fixed with a clutch member 75 which is rotatably supported on a shaft 76, and constitutes the terminal member of the feed train.

The feed rate changer 57 is as follows: Gears 77-78-79, Fig. 1, are fixed on shaft 47 and are of different diameters adapted for engagement one at a time with gears 80-81-82 respectively. The gears 80-81-82 are fixed together and slidably keyed to shaft 56 to be shifted by means of hand lever 83 fixed on a pivot or shaft 84 upon which is also fixed a lever 85 having a pivoted fork 86 engaging the faces of gear 81.

A rapid traverse train is driven from the spindle train at a point between the power source and the clutch 24, as follows: The gear 23 is fixed to the supporting shaft 36, Fig. 1, on which is also fixed a gear 87, engaging with a gear 88 fixed on a shaft 89 upon which is also fixed a driving member 90 of an extensible universal joint shaft of well known form generally denoted by numeral 91. The driven member 92 of the joint shaft is fixed to a shaft 93, Figs. 2 and 4. Shaft 93 is journaled in a sleeve 94 fixed in the housing 63. A clutch member 95 is slidably keyed to shaft 93 and at each end is provided with clutch teeth 95a—95b which may engage complementary clutch teeth on the bevel gears 96-97 or the member 95 may be centrally positioned for disengagement of the clutch teeth. Gears 96-97 are rotatable on shaft 93 and both engage a bevel gear 99, Fig. 2, which is thus driven in either direction according to clutch engagement. This clutch and gear arrangement constitutes a rapid traverse reverser, having a central disengaged position and operable by means of a lever 100 fixed to a shaft 101 having an eccentric portion 102 which engages an annular groove 103 of the clutch member 95. Bevel gear 99 is fixed with a spur gear 104 rotatable on the outside of a sleeve 105 and which drives a gear 106 through an intermediate gear 107 running on the outside of a sleeve 108. Gear 106 is fixed on a clutch member 109 which constitutes the terminal member of the quick traverse train.

A table drive train alternatively operable from the feed terminal member 75 or the quick traverse terminal member 109 is as follows: The feed and quick traverse terminal members 75-109, Fig. 2, are rotatable on a stud 76 and positioned between them is a clutch member 98 also rotatable thereon. Member 98 has clutch teeth 98a—98b on opposite ends thereof and alternatively engageable with complementary clutch teeth on the members 75-109 respectively. Fixed on member 98 is a gear 110 engaging a gear 111 fixed on shaft 112 upon which is also fixed a gear 113. Gear 113 drives an idler 114, Fig. 3, which in turn drives a gear 115 fixed on a shaft 116 upon which is also fixed a worm 117 engaging a worm wheel 118 fixed with table 6.

The table 6 may be manually rotated when clutch member 98 is disengaged, by the means of a squared end 116a on the shaft 116 and adapted to receive a hand crank, not shown.

The clutch member 98 may be manually or automatically shifted as follows: A hand lever 119, Figs. 1-5, is fixed to a shaft 120 to which a cam 121 is slidably keyed. Member 121 is provided with an annular groove 122 which is engaged by a pin 123 fixed on a lever 124. Lever 124 is fixed to a shaft 125 to which is fixed a hand lever 126, Figs. 2-3-4. Lever 126 may shift the member 121 to different axial positions along shaft 120 while hand lever 119 provides for different angular settings thereof. Member 121 is provided with a cam portion 127, Figs. 5–6–8, which engages a slot 128 of a shifter 129 slidably supported on a rod 130 and having a fork portion 129a engaging an annular groove 131, Fig. 2, of clutch member 98.

Fixed with lever 124 is a detent point 132, Figs. 3–4, against which a detent cam member 133, fixed on a pivoted arm 134, is continuously urged by a spring 135. Cam 133 provides a central notch 136 and portions on each side thereof adapted to urge the lever 124 in opposite directions respectively as soon as the point 132 passes the central notch, in the one or the other direction of movement.

Lever 124 may be moved in either direction either by hand or automatically by power. For the power movement of lever 124 in the one direction dogs such as 137, Fig. 3, are adjustably fixed on table 6 by means such as T bolts 138 engaging a T slot 139, Fig. 2, in the periphery of the table, and are adapted during table movement in either direction to shift the lever in the same direction through a trip element 140 arranged to be contacted by cam portions 141 or 142 of the dog and fixed on an arm 143 which is fixed with the lever 124. For power movement of the lever 124 in the other direction dogs such as dog 144, Fig. 3, are adjustably fixed on table 6 by means such as T bolts 145 fixed in the T slot 139 and are adapted during either direction of table movement to shift the lever in the same direction through contact of cam portions 146 or 147 with the trip element 140.

The cam portion 127 of member 121 provides different operating connections between lever 124 and clutch member 98 according to the angular position of the cam relative to the slot 128 in shifter member 129 and as determined by hand lever 119. The different portions 148–149–150–151, Figs. 7–8, of the cam, which turned to engage slot 128, are productive of the following results. When the portion 148 of cam 127 engages the slot 128 the cam portion substantially fills the slot and there is no lost motion between the movement of lever 124 and the clutch member in either direction of movement, and in such case, in either direction of the power movement of lever 124, the clutch member 98 arrives in a central, non-power transmitting position at the same time that the detent point 132 is engaged in the central notch 136, and movement of table 6 then stops, only to be started again by a hand operation of lever 126.

When the portion 149 of cam 127 engages the slot 128 of shifter 129, such cam portion being cut away on one side as shown in Fig. 8, there is lost motion between lever 124 and clutch member 98 in one direction of movement but not in the other, whereby during power movement of the lever in the lost motion direction, the point 132 of the detent has moved past the central notch 136 before the clutch member 98 disengages, and immediately disengagement takes place the detent cam and spring 135 continue the movement into opposite clutch engagement. When using cam portion 149 for the other direction of power movement of lever 124, there then being no lost motion in such direction, the detent point arrives at the central notch at the same time that the clutch disengages and the table then stops.

When the portion 150 of cam 127 engages the slot 128 the action is similar to that for the portion 149 just described, but in this case cut-away portion is on the opposite side of the cam and the directions of lever movement respectively productive of a table stop or of continued table movement are reversed.

When the portion 151 of cam 127 is engaged with slot 128 of shifter 129, the cam then being cut away on both sides as shown in Fig. 8, there is lost motion between the lever 126 and clutch 98 in either direction of lever movement and in either direction the clutch member will be carried into opposite engagement by the detent mechanism.

The various operating positions of the levers 68–100 and 119 are defined by the means of spring plungers movable with the respective levers and engaging detent recesses in the member over which the lever moves. Since these are similar for each lever only the one for lever 100 is shown in detail, Fig. 2. The plunger 152 is urged by the spring 153 into recesses such as 154, but may be withdrawn therefrom by the means of a handle portion 155 for shifting the lever to engage a different recess.

The cam 127 and associated parts provide a multiple stop device adjustable for different effects in the automatic control of the machine. Still other different control effects are obtained by differently positioning the reversers of the feed and rapid traverse trains previously described.

A diagram of the several levers and their different positions together with the operative effect of different combinations of lever positions is shown in Fig. 9. From this chart there have been omitted the obvious entirely hand controlled movements and some of the less useful automatic cycles. All the cycles shown are obtained by suitable dogs similar to the dogs 137–144 acting on the lever 126, except that where the cycle includes a stop, it must be started again by hand movement of lever 126.

The following examples illustrate the use of some of the cycles shown in Fig. 9. The cycle marked A, for instance, may be used with two or more workpieces fixed on the rotary table. If the cutting time is longer than the loading time and the workpieces are suitably spaced, the operator may load and unload the work at the side of the table farthest from the cutter while the cutter is operating on another work piece. If, however, the loading time is longer than the cutting time either of two methods may be used. The length of the slow or feed movement may be increased in a cycle such as A to give the operator sufficient loading time, or preferably a cycle such as the cycle marked B, Fig. 9, may be used. In such case the table movement stops after each feed movement, and after the operator has finished loading he starts the table by a hand movement of lever 126. In either of the above instances any idle or non-cutting table movement may be performed at a quick traverse rate, whereby high production may be obtained with a relatively small number of holding fixtures for the workpieces.

What is claimed is:

1. In a milling machine the combination of a rotatable tool spindle, a work table rotatably supported adjacent thereto for the milling of work pieces by a cutter fixed with said spindle, a power drive for said spindle including a power source and a main clutch, transmission mechanism for said rotation of said work support including a feed train driven from said power source through said main clutch and providing a feed rate changer, a rapid traverse train driven from said power source to exclude said rate changer and clutch, and clutch means shiftable in opposite directions for alternative actuation of said table from the one or the other of said trains, and control means for said transmission mechanism including a shiftable trip element connected for the shifting of said clutch means, and a plurality of dogs spaced apart on said table to shift said element in opposite directions respectively and each adapted during unidirectional movement of said table to repeatedly contact and shift said trip element.

2. In a milling machine the combination of a rotatable tool spindle, a work support rotatable adjacent thereto for the milling of work pieces by a cutter fixed with said spindle, a power drive for said spindle including a power source, transmission mechanism for rotation of said work support including a feed train driven from said power source and providing a rate changer, a quick traverse train driven from said power source to exclude said rate changer and clutch means shiftable to different positions respectively to connect the one or the other of said trains to rotate said work support and to an intermediate disconnected position, and control means for said transmission mechanism including power operated shifting means for said clutch means and a manually operable multiple stop device adjustable to selectively cause said power shifting means to shift said clutch means from one of its first mentioned positions to either other position.

3. In a milling machine the combination of a rotatable tool spindle, a work support rotatably supported adjacent said spindle for the milling of work pieces by a cutter fixed with said spindle, a power drive for rotating said spindle including a power source, transmission mechanism for rotating said work support including a feed train driven from said power source, a quick traverse train driven from said power source, and clutch means shiftable to different positions respectively to connect said support with different of said trains said clutch means being also shiftable to an intermediate disconnected position, and control mechanism for said transmission mechanism including a trip element connected for movement of said clutch means and having corresponding positions, and a dog on said support normally adapted to shift said trip element from a position corresponding to one of the first mentioned positions of said clutch means to said intermediate position, the connection of said trip element with said clutch means including a multiple stop device adjustable to change the effect of said dog.

4. In a milling machine the combination of a rotatable tool spindle, a work support rotatable adjacent said spindle for the milling of work pieces by a cutter fixed with said spindle, a power drive for said spindle including a power source and a main clutch, transmission mechanism for said rotary movement of said work support and including a feed train driven from said power source through said main clutch and providing a rate changer, a rapid traverse train driven from said power source to exclude said main clutch and rate changer and clutch means shiftable in opposite directions respectively for connecting the one or the other of said trains to rotate said work support, and control means for said transmission including a shiftable trip element having motion transmitting connections for shifting said clutch means, a dog movable with said work support and normally adapted to shift said element whereby to shift said clutch means from one train connection to the other, and means associated with said motion transmitting connections and adjustable to prevent said other train connection.

5. In a milling machine the combination of a rotatable tool spindle, a work support rotatably supported adjacent said spindle for the milling of work pieces by a cutter fixed with said spindle, a power drive for rotating said spindle and including a power source, transmission mechanism for rotary movement of said work support including a feed train driven from said power source, a rapid traverse train driven from said power source and a clutch alternatively shiftable to opposite positions respectively for engaging the one or the other of said trains with said work support or to an intermediate position of disengagement, and control means for said transmission including a shiftable trip element, power operated means for shifting said element in either direction, and motion transmitting connections from said trip element to said clutch and including a multiple stop device adjustable to alternative positions providing lost motion in either or both directions of clutch movement and to another position providing no lost motion, whereby in either or both directions of movement of said element, said clutch may be shifted from the one to the other of said opposite positions or to said intermediate position.

6. A milling machine as specified in claim 5 in which there is provided a manually operable shifter connected for selective adjustment of said multiple stop device to each of the said positions thereof, said shifter being adapted for the position thereof to visibly indicate the position of adjustment of said multiple stop device.

7. In a milling machine the combination of a rotatable tool spindle, a work support rotatably supported adjacent said spindle for the milling of work pieces by a cutter fixed with said spindle, a power drive for rotating said spindle including a power source, transmission mechanism for rotating said work support including a feed train driven from said power source and providing a reverser, a quick traverse train driven from said power source and providing a reverser, and clutch means shiftable to engage with the one or the other of said trains to rotate said work support, and control mechanism for said transmission including a power operable device operable to shift said clutch means and including a dog fixed on said work support and adapted during unidirectional rotation of said work support to repeatedly operate said device.

8. In a milling machine the combination of a rotatable tool spindle, a work support rotatable adjacent said spindle for the milling of work pieces by a cutter fixed with said spindle, a power drive for said spindle including a power source and a main clutch, transmission mechanism for rotation of said work support including a feed train driven from said power source through said main clutch and including a rate changer, a power rapid traverse train unaffected by said main clutch and rate changer, reversing means for changing the direction of support rotation, and clutch means alternatively shiftable to connect said work support to be driven from the one or the other of said trains, and control means for said transmission mechanism including manually operable means for operating said reversing means, a shifter for shifting said clutch means, and a dog movable with said support and operable during unidirectional movement of said support to repeatedly operate said shifter.

9. In a milling machine the combination of a rotatable tool spindle, a work support rotatable adjacent said spindle for the milling of work pieces by a cutter fixed with said spindle, a power drive for rotating said spindle including a power source, a main clutch and a spindle rate changer driven through said main clutch, transmission mechanism for rotation of said support including a feed train driven from said power source through said main clutch but to exclude said spindle rate changer and providing a feed rate changer, a rapid traverse train driven from said power source but to exclude said rate changers and said main clutch, and clutch means alternatively shiftable to connect said support for rotation from the one or the other of said trains, and control mechanism for said transmission mechanism including trip means connected for the shifting of said clutch means and a dog rotatable with said work support and adapted during uni-directional rotation thereof to repeatedly operate said trip means.

10. In a milling machine the combination of a stationary column, a spindle rotatably supported therefrom, a knee vertically bodily movable on said column, a rotatable work table supported from said knee for bodily vertical movement adjacent said spindle, a power train for said spindle including a power source and a motion interrupting clutch, transmission mechanism for rotation of said work table including a feed train providing a rate changer supported from said column and driven from said power source through said main clutch and a feed terminal member bodily vertically movable with said knee, a power rapid traverse driven independently of said rate changer and providing a quick traverse terminal element bodily vertically movable with said knee, and clutch means supported for bodily movement with said knee and shiftable to different positions respectively to connect the one or the other of said terminal elements to rotate said table, and control means including dogs carried by said rotatable table and operable for alternately shifting said clutch means to different of said positions.

11. In a milling machine the combination of a rotatable spindle, a work table adjacent thereto and rotatable for the milling of work pieces by a cutter fixed with said spindle, a power train for said spindle including a power source, transmission mechanism for rotation of said work table including a feed train driven from said source and providing a reverser, a quick traverse train driven from said source and providing a reverser, and clutch means alternatively shiftable to different positions respectively for connecting the one or the other of said trains to rotate said table, a power operated control means for shifting said clutch means including a multiple stop device adjustable for different control effects, and control means for still other control effects including manually operable means for shifting said reversers.

12. In a milling machine the combination of a rotatable tool spindle, a work support movable adjacent thereto for the milling of work pieces by a cutter fixed with said spindle, a power drive for said spindle including a power source, transmission mechanism for said movement of said work support including a feed train driven from said power source and providing a reverser, a quick traverse train driven from said power source and providing a reverser, and clutch means alternatively shiftable to different positions respectively for connecting the one or the other of said trains to move said work support, and control mechanism for said transmission mechanism including power operated means for shifting said clutch means and providing a multiple stop device adjustable for determining different control effects of said power operated means, and means for determining still other control effects of said power operated means including hand levers for selectively individually shifting said reversers.

13. In a milling machine the combination of a rotatable tool spindle, a work support movable adjacent said spindle for the milling of work pieces by a cutter fixed with said spindle, a power drive for rotating said spindle including a power source, transmission mechanism driven from said power source for said movement of said work support including clutch means shiftable in opposite directions to positions respectively productive of different support movements and to an intermediate position, and control means for said transmission mechanism including a trip element shiftable in opposite directions, a dog fixed on said support for shifting said trip element, motion transmitting connections between said trip element and said clutch means providing a multiple stop device adjustable to two positions respectively determining different amounts of movement of said clutch means in one direction and to two other positions respectively determining different amounts of movement of said clutch means in the other direction, and a manually movable element connected for adjustment of said multiple stop device to each of its said positions.

14. In a milling machine, the combination of a stationary column, a spindle rotatably supported therefrom, a knee vertically bodily movable on said column, a rotatable work table supported from said knee for bodily vertical movement adjacent said spindle, a power train for said spindle including a power source and a motion interrupting clutch, transmission mechanism for rotation of said work table including a feed train providing a rate changer and driven from said power source through said main clutch, and a feed terminal member bodily vertically movable with said knee, a rapid traverse train driven from said power source to exclude said rate changer and main clutch and providing a quick traverse terminal element bodily vertically movable with said knee, and clutch means supported for bodily movement with said knee and shiftable to different positions respectively to connect the one or the other of said terminal elements to rotate said table, and control means for said transmission mechanism including dogs fixed on said rotatable table and operable for alternately shifting said clutch means to different of said positions.

In witness whereof I have hereto affixed my signature.

JOSEPH B. ARMITAGE.